Sept. 8, 1931.      S. D. BROWN ET AL      1,822,582

TRACTION CLEAT FOR VEHICLE WHEELS

Filed Nov. 9, 1928

Inventor
Stephen D. Brown and
Charles E. Shook,
By G. C. Kennedy.
Attorney

Patented Sept. 8, 1931

1,822,582

UNITED STATES PATENT OFFICE

STEPHEN D. BROWN AND CHARLES E. SHOOK, OF WATERLOO, IOWA; SAID SHOOK ASSIGNOR OF ONE-SIXTH TO SAID BROWN

TRACTION CLEAT FOR VEHICLE WHEELS

Application filed November 9, 1928. Serial No. 318,226.

Our invention relates to improvements in traction cleats for vehicle wheels, and the object of our improvement is to provide cleat devices for carrying wheels, particularly for those of tractors, which are provided with mountings so arranged and positioned that the cleats may be removably seated on the tread of a wheel and may be after removal quickly and easily changed to be removably secured to the inner face of the wheel, when it is desired to have the wheel tire without cleats in order to pass over surfaces which might be damaged thereby.

Figure 1:
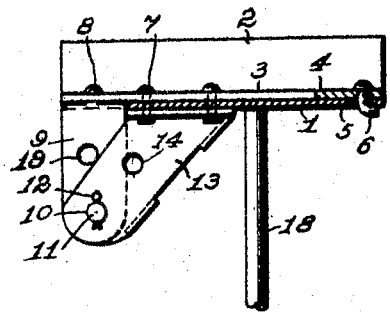
Figure 2:
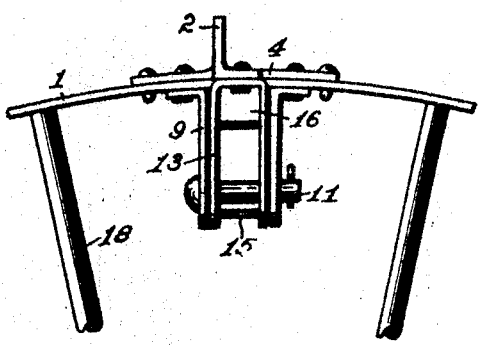
Figure 5:
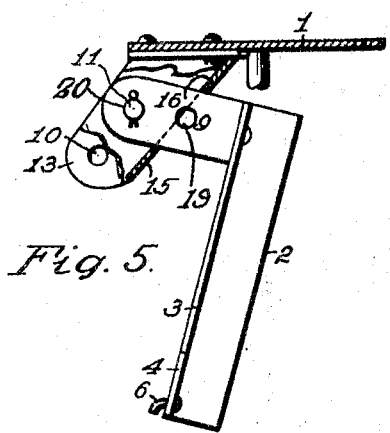
Figure 3:
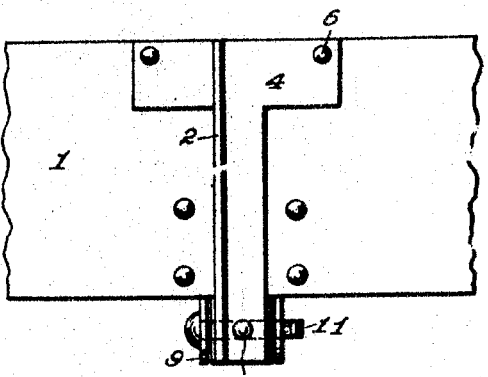
Figure 4:
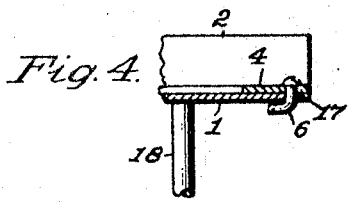

This object we have accomplished by the means which are hereinafter described and claimed, and which are illustrated in the accompanying drawings, in which Fig. 1 is a cross sectional view of the tread part of a tractor wheel with other parts broken away, and showing our cleat device and mounting in side elevation with the cleat mounted upon the outer or tread surface of said rim part. Fig. 2 is a side elevation of said wheel part showing the cleat and its mounting thereon as shown in said Fig. 1. Fig. 3 is a plan of said wheel tread showing the cleat fastened across its face as shown in the said figures. Fig. 4 is a fragmentary view of said tread part, showing a modified way of securing one end of the cleat to the wheel tread. Fig. 5 is a cross section of the tread part, similar to that of said Fig. 1, but showing the cleat removed from the tread face and secured in its mounting upon the inner face of the tread part.

It is to be understood that various modifications may be effected legally in our device without departing from the invention or the protection of our claims.

Tractors having cleats permanently fixed across the treads will damage asphalt or other impressible surfaces traversed, so it is important that such cleats shall be easily and quickly removed from the treads to be replaced later, after such surfaces have been crossed.

In order to obviate this, we have provided a cleat device mounting which successfully overcomes said inconvenience and permits the driver of a tractor to quickly change the cleats from the tread of the wheels and mount them within the periphery of the same where they are out of the way, so that the tractor may be driven over pavements or places of the kind mentioned without injury thereto, the cleats being easily replaced upon the treads fixedly after leaving such places.

1 is a cross section of the metal tread part of a tractor wheel mounted on spokes 18, the remainder of the wheel not being shown. 2 is the outwardly directed flange of a cleat body 3, extending at a right angle therefrom. The cleat as a whole may be an angle bar, and as shown may cross the tread part 1 transversely. The cleat base body 3 has a cross part or T-end 4 in apertures of which T hooked rivets 6 are fixed which may be inserted in holes 5 in the tread near its one edge and the cleat then hingedly swung over upon the tread and across it in contact therewith. On the under face of the cleat body 3 at its opposite end is riveted at 8 a U-shaped member 9 whose furcations near their outer ends have transversely alined bolt-holes 20 and 19 to seat alternately a headed bolt 11 which is removably secured by a split-key 12 or any other desired fastening means.

The numeral 13 denotes a pair of like but relatively reversed lugs having outturned feet riveted to the tread 1 by rivets 7, the lugs projecting inwardly from the inner face of the tread, and having transversely alined bolt-holes 14 and other holes 10 nearer their ends. The lugs 13 are directed slopingly outwardly to project a little beyond the adjacent edge of the wheel tread and are united by spaced integral cross parts 15 and 16, best shown in Figs. 1 and 2.

In Fig. 4 is shown a modification of the means for securing the cleat body 3 upon the outer face of the tread, but which is considered to be a mechanical equivalent of the means shown in Figs. 1 and 2, and consists in providing edge notches 17 in the tread to receive removably hook-rivets 6′ turned inwardly, and which thus secure the cleat firmly in place on the tread.

When the cleat body 3 is mounted across the outer tread surface of a wheel as shown in Fig. 1, the furcations or arms of the U- shaped member 9 are received within the lugs 13 and in contact therewith with the holes 10 in the lugs registering with the outer holes in the arms 9, the bolt 11 traversing both and the split-key or pin 12 securing the bolt removably in place thus fastening the cleat fixedly upon the tread. It is only necessary to remove the split-key 12, and take the bolt 11 from said registering holes to allow removal of the cleat arms 9 from the lugs 13, when the cleat may be swung away from the tread slightly to permit the removal of the hooked rivets 6 from the tread holes 5.

The device may be positioned within the wheel tread as shown in said Fig. 5, by inserting the arms 9 between the lugs 13 from the opposite side to that of their former location in the interspace between the cross connecting parts 15 and 16, in which interspace the arms slidably fit. The bolt 11 is then inserted in the registering holes 14 and 10 of the lugs and arms respectively. The bolt 11 thus fastens the cleat device rigidly to the inner face of the tread 1 to project only slightly therefrom. The edges of the arms 9 then bind with the abutting edges of the parts 15 and 16, locking these members together. The cleat device is removed from the inner position described, by merely removing the bolt. Then the cleat may be replaced upon the wheel tread if desired.

A great advantage resides in the fact that when the tractor is in use in fields or soft dirt roads, the cleat devices may be readily removed so that they do not clog up with hardened mud or clay, requiring considerable labor for removal, as only the lugs 13 may remain permanently upon the inner face of the tread rim, out of the way, yet easily cleaned from mud.

Having described our invention, what we claim as new, and desire to secure by Letters Patent is:

1. The combination with a wheel rim having a channel-bar bracketed on its inner face, of a traction cleat seated across the outer face of the rim and having one end removably secured thereto, said cleat having on its opposite end a device opposed to the said channel-bar and releasably secured thereto, said channel-bar having an apertured cross-connection to receive said device when the cleat is detached from and then mounted within the rim, and means for releasably locking said device in the said aperture in that position.

2. The combination with a wheel rim having engaging means fixed on its inner face, of a traction cleat having one end detachably fastened to the rim and having at its opposite end inwardly projecting spaced fixed elements, means for releasably securing said fixed elements to said engaging means when the cleat is in operative position, and other means for releasably securing the fixed elements to said engaging means when the cleat is in a reversed position to its operative position, said engaging means including spaced elements with an apertured connection adapted to receive in its aperture said spaced fixed elements, and means to secure the fixed elements in said aperture.

In testimony whereof we affix our signatures.

STEPHEN D. BROWN.
CHARLES E. SHOOK.